United States Patent [19]
Seneff et al.

[11] Patent Number: 5,221,451
[45] Date of Patent: Jun. 22, 1993

[54] AUTOMATIC CHLORINATING APPARATUS

[75] Inventors: William L. Seneff, Mesa; Ronald L. Athey, Phoenix, both of Ariz.

[73] Assignee: Global Ionization Products, Inc., Scottsdale, Ariz.

[21] Appl. No.: 853,076

[22] Filed: Mar. 17, 1992

[51] Int. Cl.$^5$ .................. C25B 9/00; C25B 15/08
[52] U.S. Cl. .................. 204/229; 204/230; 204/263; 204/266
[58] Field of Search .................. 204/263–266, 204/252–258, 275–278, 229, 242, 230

[56] References Cited

U.S. PATENT DOCUMENTS

| | | | |
|---|---|---|---|
| 11,244 | 6/1892 | Wolf | 204/277 X |
| 1,234,319 | 7/1917 | Euler | 204/242 |
| 4,493,760 | 1/1985 | Bianchi | 204/278 |
| 4,496,452 | 1/1985 | Bianchi | 204/278 X |
| 4,724,059 | 2/1988 | Collier | 204/229 |

*Primary Examiner*—Donald R. Valentine
*Attorney, Agent, or Firm*—LaValle D. Ptak

[57] ABSTRACT

A pressurized gas chlorinator is constructed in the form of a two-compartment pressurized container. The lower container is filled with a media liquid, such as hydrochloric acid (HCl). A pair of electrodes are located in the lower container beneath the surface of the media liquid, with one of the electrodes located at or near the bottom of the container and the other electrode located at or just below the top surface of the media liquid. Electric current is applied to the electrodes to cause a breakdown of the HCl into Hydrogen and Chlorine gas. A floor member is spaced a short distance above the surface of the media liquid in the lower compartment, and has an opening in it. This floor member comprises the bottom of the upper compartment; and gas is passed upwardly through the opening in the floor member into the upper compartment. Side walls surround the opening, and transport liquid (typically, water) flows into and out of the upper compartment around the side walls to absorb the gases, which are under pressure in the upper portion of the upper container. When the gas pressure drops, some of the transport liquid is permitted to pass over the top of the side walls to drop through the opening in the floor member to replenish the media liquid, which is constantly being depleted by means of the electrolysis action. This prevents excess gases from being present in either the lower chamber or the upper chamber.

16 Claims, 2 Drawing Sheets

AUTOMATIC CHLORINATING APPARATUS

BACKGROUND

In the maintenance of swimming pools, cooling towers, and the like, it is a routine practice to provide some means for purifying the water to eliminate the build-up of bacteria and algae in the water. Most of these systems employ recirculated water; so that the water which is purified is recirculated back through the system on a continuous basis.

A relatively common solution for the purification of water, particularly in swimming pools, is to add chlorine in the form of liquid chlorine compounds, or in the form of solid compounds, such as pellets or granules, to control bacteria growth. These chlorine compounds are added, either continuously or intermittently, by supplying them directly into the pool water. Particularly when such compounds are added intermittently, the chlorine level in the pool fluctuates considerably. As a consequence, the control of the bacteria and the algae in the water is imprecise.

In an effort to eliminate or substantially minimize the amount of chlorine which is to be added to a pool or cooling tower system, electrochemical ionization systems have been devised. One such system is disclosed in the patent to Henson U.S. Pat. No. 4,525,272. The device disclosed in this patent is an electrolytic water purification apparatus, which kills algae and bacteria while eliminating the use of chlorine or other toxic chemicals, or at least minimizing the use of such chemicals for purifying the water.

In the device disclosed in the Henson patent, a constant direct current is passed between a copper anode and a steel cathode immersed in a recirculating stream of water with which the device is used. The device produces copper ions, which kill algae and bacteria in the water passing through the device. Oxygen produced at the cathode promotes the decomposition and oxidation of bacteria in the water. The Henson device, however, still generally requires some additional means for completely eliminating algae and bacteria, particularly when it is used in cooling towers and similar applications.

For large commercial swimming pools and cooling towers, chlorine gas frequently is injected into the recirculating water in measured amounts for producing the desired purification. In such systems, bottled chlorine gas typically is used; and this gas is bled into the pool water as required. The size of such systems, and the expense of the hardware employed, however, generally limit bottled chlorine gas systems to relatively large commercial pool systems or cooling tower systems.

Efforts have been made to generate chlorine gas from a media liquid, such as brine or hydrochloric acid (HCl) for utilization in a water purification system capable of being used in home or backyard swimming pool systems, as well as large commercial pools. This is accomplished by electrolytic cells, which employ an anode and cathode immersed in a brine or HCl solution to cause a decomposition of the solution into components including chlorine gas. The chlorine gas which is produced then typically is mixed with the recirculating water of the pool in a venturi mixer, or is bubbled through the water by some other technique.

Five patents which illustrate electrolytic chlorinators using a brine solution are the patents to Kirkham U.S. Pat. No. 3,669,857; McCallum U.S. Pat. No. 4,085,028; Persson U.S. Pat. No. 4,136,005; Richards U.S. Pat. No. 4,439,295; and Collier U.S. Pat. No. 4,555,323. These patents all disclose different devices to produce, electrolytically, chlorine gas from a brine solution The gas which is produced then is supplied to some type of mixer, which injects it into the water. The byproducts from "brine" generators of these devices include caustic sodium.

Two patents, to Russell U.S. Pat. No. 4,381,240 and Carlsson U.S. Pat. No. 4,701,265, disclose chlorine generators employing hydrochloric acid for the media liquid. Both of these patents also disclose different devices utilizing vertically oriented anodes and cathodes, which are immersed, at least partially, into the acid. Direct current is applied across the electrodes causing the acid to decompose, generating chlorine and hydrogen gases. The chlorine gas then is bubbled into the water to be dissolved therein.

In the various patents of the prior art mentioned above, the systems are operated essentially as non-pressurized systems. A safety problem can exist if, for some reason, excess chlorine gas is generated and produces a relatively high pressure. The gas also is highly caustic; and provisions must be made to prevent pressure build-up. In addition, since all of the foregoing patents employ vertically oriented electrodes, if the liquid medium, whether it is brine or hydrochloric acid, drops to some low level, current still passes between the electrodes. This means that a relatively large volume or space can be produced above the low liquid level; and this space is filled with chlorine gas. Since the electrodes extend through the chlorine gas, a spark can be produced between the elctrodes, resulting in an explosion, since chlorine gas is highly explosive in nature. As a consequence, there is an inherent danger of explosion in such systems. Consequently, liquid level sensors frequently are employed to terminate operation of the electrolytic chlorinators in the event the media liquid drops below some pre-established level. If a malfunction, however, should exist in the sensor for accomplishing this, the dangerous condition still exists. These systems do not have a "fail-safe" mode of operation.

It is desirable to provide an electrolytic chlorination device, which overcomes the disadvantages of the prior art, which is highly effective in the production of chlorine from liquid media, which operates with inherent safety features, and which produces no hazardous byproducts.

SUMMARY OF THE INVENTION

It is an object of this invention to provide an improved automatic chlorinating system.

It is another object of this invention to provide an improved automatic system for generating chlorine gas, and mixing such gas with recirculating water for a swimming pool or cooling tower.

It is an additional object of this invention to provide an improved electrolytic chlorination system for supplying chlorine gas under pressure to water to be purified.

It is a further object of this invention to provide an automatic electrolytic chlorination system which eliminates the possibility of producing electrical sparks across the electrodes used to generate chlorine gas.

In accordance with a preferred embodiment of the invention, a chlorine generator is provided in the form of a dual-compartment sealed container. The container has a lower compartment, in which chlorine generating media liquid, such as hydrochloric acid, is provided. A floor member separates the top of this compartment from an upper sealed compartment. The floor member has an opening in it, with side walls surrounding the opening and extending upwardly from it, terminating at a point below the top of the upper compartment. A pair of spaced-apart electrodes are located in the lower compartment, with one of the electrodes near the bottom and the other one near the top. The media liquid in the lower compartment covers the electrodes, leaving a relatively small space between the top of the media liquid and the floor or divider which separates the compartments. When current is applied to the electrodes, chlorine gas is produced and passes through the opening in the floor member into the upper compartment. The upper compartment is supplied with water circulating through it; and the gas builds up a pressure above the water to force the gas into solution in the water.

DETAILED DESCRIPTION

Figure 1:
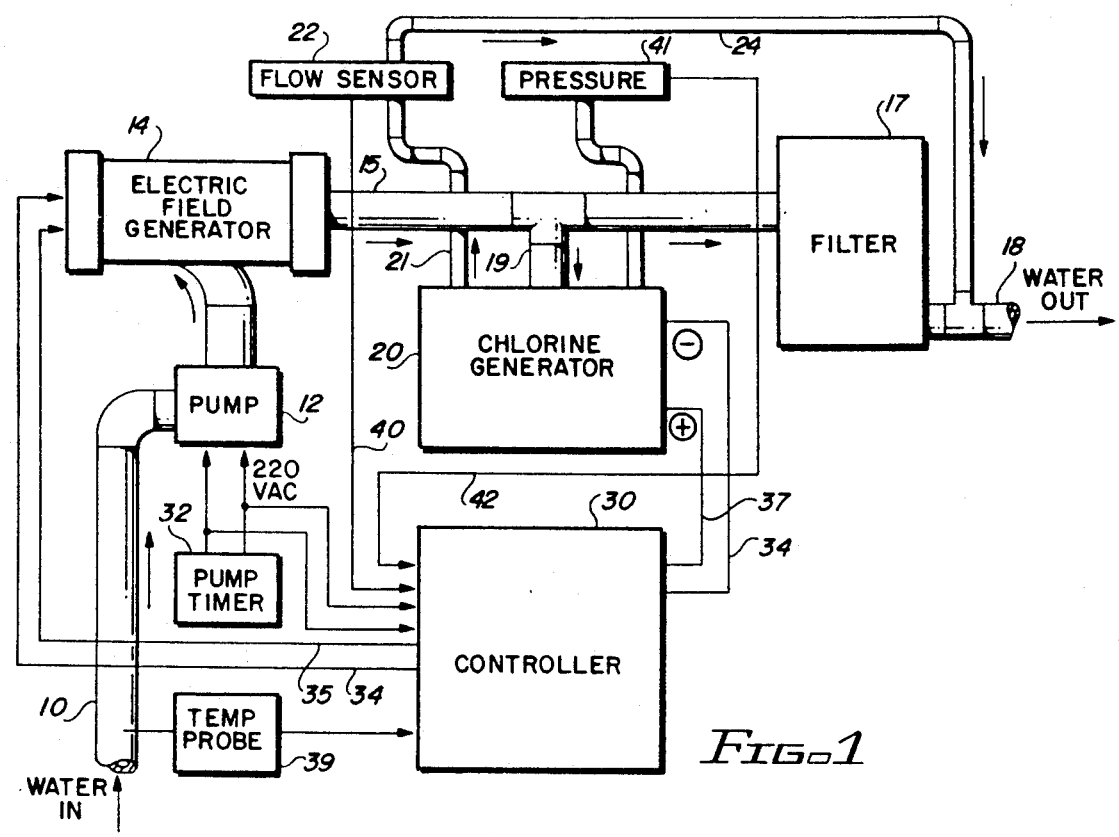
FIG. 1 is a diagrammatic representation of a system including a chlorine generator according to a preferred embodiment of the invention.

Reference now should be made to the drawings, in which the same reference numbers are used throughout the different figures to designate the same or similar components. FIG. 1 is a diagrammatic illustration of a water circulation system employing a chlorine generator in accordance with a preferred embodiment of the invention.

As illustrated in FIG. 1, water to be purified is supplied through a pipe 10 under the control of a pump 12 operated by a pump timer 32, which supplies 220 VAC operating power to the pump. A control unit 30 also receives 220 VAC input power from the pump timer 32. In a typical pool recirculation system, the timer 32 is employed for controlling the turning on and turning off the pump 12; and this same timer provides the same control for the control unit or controller 30.

Whenever the pump 12 operates, water is pulled through the pipe 10 and is supplied to an electric field generator 14, which preferably is of the type disclosed in U.S. Pat. No. 4,525,272, described above. DC operating current for the field generator 14 also is supplied from the controller 30 over a pair of leads 34 and 35 to cause the field generator 14 to produce copper ions as a first stage of water purification. In addition, the electric field, produced in the electric field generator 14, causes a flocculation of molecules of dispersed contaminants in the water. This assists in sedimentation of the dissolved solids, and facilitates the ability of a conventional filter 17, connected to the generator 14 by a pipe 15, to remove contaminants from the water. Consequently, the electric field helps to remove both organic and inorganic materials, which normally require relatively large amounts of chlorine to oxidize and/or precipitate from the water. Utilization of the electric field generator 14 reduces the amount of chlorine which otherwise would need to be used to provide the desired level of purification.

The electric field generator 14, however, does not provide all of the purification which is required for the water being circulated by the pump 12. To complete the purification, an electrolytic chlorine generator 20 is provided. Current applied to the electrodes in the chlorine generator 20 is obtained from a controller 30 over a pair of leads 37 and 38, whenever the controller 30 is operative. Chlorine generated by the generator 20 is added to a portion of the water circulated by the pump 12 by supplying some of the water passing through the pipe 15 through a smaller diameter pipe 19 to the chlorine generator. After chlorine from the generator 20 is dissolved in the water, it is returned through a pipe 21 and a flow sensor 22 to a plumbing "T" on the output side of the filter 17; so that the filtered and chlorinated water in the system is supplied out through a pipe 18. If the system is used in conjunction with a swimming pool, the pipe 18 is connected to the return nozzles of the pool, and the pipe 10 is connected to the skimmer and drain in a conventional manner.

A flow sensor 22 is employed to monitor the flow of water through the pipes 19 and 21, and, therefore, through the chlorine generator. If the flow through the pipe 21 from the chlorine generator drops below some threshohold value, a signal is supplied from the flow sensor 22 to the controller 30 to terminate the application of current to the leads 37 and 38 connected to the electrodes in the chlorine generator. In addition, if the pressure of chlorine gas should build up in the chlorine generator 20 to a pressure exceeding a safe threshhold pressure, a pressure gauge 41 senses the pressure, and applies a signal over a lead 42 to the controller 30, which, again, operates to terminate the application of current to the leads 37 and 38. Accordingly, if excess pressure or low flow rate of the water leaving the chlorine generator 20 is sensed, the controller 30 operates to terminate production of chlorine by the chlorine generator 20. This ensures a safe operation of the generator at all times.

Figure 2:
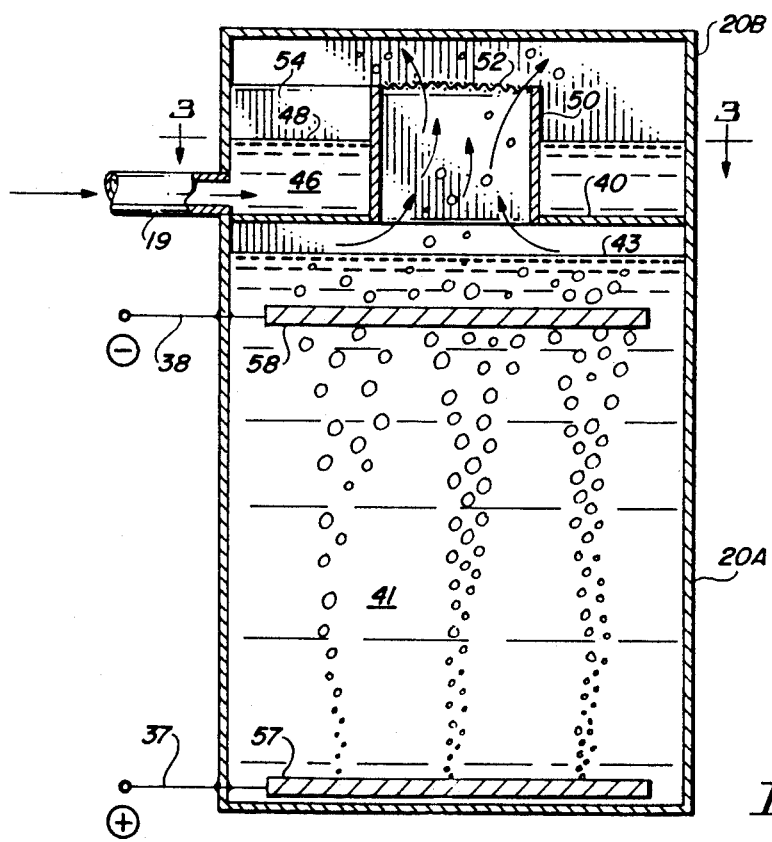
FIG. 2 is a cross-sectional side view of the chlorine generator of FIG. 1.
Figure 3:
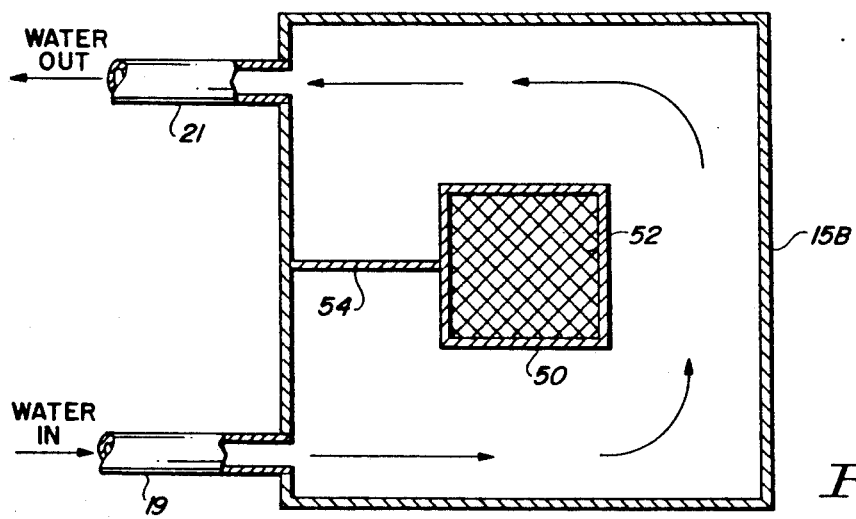
FIG. 3 is a cross-sectional top view taken along the line 3—3 of FIG. 2.

Reference now should be made to FIGS. 2 and 3, which show details of the actual structure of the chlorine generator 20. As illustrated most clearly in FIG. 2, the chlorine generator comprises two sealed compartments, a lower compartment 20A and an upper compartment 20B. The lower compartment 20A has a liquid media, such as hydrochloric acid (HCl) placed in it as a chlorine producing medium. The compartment 20A may be made with any desired capacity; but for a relatively small swimming pool, the compartment 20A is designed to hold approximately twenty-two gallons of hydrochloric acid. The compartments 20A and 20B are made of fiberglass or other suitable material.

A pair of electrodes 57 and 58 are located, respectively, near the bottom of the compartment 20A, and at or near the top, as shown in FIG. 2. The conductors 37 and 38 then are connected through the wall of the lower compartment 15A. So long as the media 41 is at a level above the electrode 58, current passes between the electrodes 57 and 58 to cause electrolytic generation of chlorine by a breakdown of the HCl liquid in a well known manner. Typically, the upper surface 43 of the liquid media 41 is slightly below a floor or divider plate 40, which serves to differentiate the lower compartment 20A from the upper sealed compartment 20B.

In the center of the floor plate 40, a rectangular or square opening is provided, with upright side walls 50 extending from the floor 40 upward to a point short of the top of the upper sealed compartment 20B. Consequently, gases produced by electrolysis in the lower compartment 20A are free to pass upwardly, as indicated by the arrows, through the opening defined by the side walls 50, into the upper part of the upper compartment 20B. If desired, a screen 42 may be placed over the top of the opening around the upper edges of the side walls 50. As illustrated most clearly in FIG. 3, a baffle plate 54 also extends upwardly from the floor 40 to the top of the side walls 50 to prevent any water passing into the upper chamber through the pipe 19 from moving directly to the outlet pipe 21. As is readily apparent from an examination of FIG. 3, the water supplied through the pipe 19 passes generally in the path of the arrows around the central core provided by the side walls 50, and then exits through the pipe 21.

Hydrogen and chlorine gases pass upwardly into the upper portion of the sealed upper compartment 20B, and builds up pressure (to approximately 10 psi) above the level of the water 46 circulating around the side walls 50. This relatively high pressure causes the gases to be in continuous contact with the water circulating through the upper compartment, and forces the gases to be dissolved in the water. In addition, the gases may be condensed into liquid droplets on the walls of the upper compartment 20B of the pressurized unit; and these droplets drip or flow into the water 46 moving through the upper compartment. The result is a highly efficient transfer of the chlorine into the water circulating through the chlorine generator 20. In addition, none of the gas generating liquid is exposed to air or any other contaminating factors. The pressure difference on the inlet side of the pipe 19 and the outlet side 21 is selected to be sufficient to produce the desired flow of water through the upper compartment 20B of the chlorine generator.

When the lower compartment 20A is filled with hydrochloric acid to the level 43, operation of the system produces chlorine gas, as described above. The operating pressure of this gas (approximately 10 psi) maintains the level of the water 46 in the upper compartment 20B at a level 48, which is below the upper edge of the side walls 50. This is accomplished by designing the internal dimensions of the upper compartment 20B to keep the water 46 passing through the compartment 20A from coming into contact with the media liquid (hydrochloric acid) in the lower compartment 20A.

When the pressure of the gas above the surface 48 of the water 46, however, reduces, due to a depletion of the hydrochloric acid media 41 or other causes, the water level 48 in the compartment 20B rises to increase the pressure (reducing the volume of the gas). This permits a splashing over the side walls 50 of some of the water through the screen 52 to drop through the opening in the floor 40 to mix with the media liquid 41 in the lower compartment 20A. As a result, the level of the media liquid is maintained substantially at the level 43 indicated in the drawing, since the water which splashes over the upper edge of the side walls 50 compensates for the depletion of the hydrochloric acid as a result of the electrolytic action caused by the electrodes 57 and 58. This operation also serves to maintain the level of the media liquid 41 above the upper electrode 58; so that current is allowed to pass through the media 41 between the electrodes 57 and 58.

A second advantage of the controlled spillover of water 46 into the lower compartment 20A is that the "gas chamber" above the surface of the liquid 43 in the lower compartment is maintained at a minimum volume. This minimizes the potential for an explosion.

Obviously, at some point, the continual depletion of the hydrochloric acid in the media liquid 41, and its dilution with water which is spilled over the top of the side walls 50, will result in a situation where the hydrochloric acid media liquid is essentially depleted. This is sensed in the controller 30, as a result of reduced current flow through the leads 37 and 38 across the electrodes 57 and 58. When this current drops to some predetermined level, a signal may be provided to the operator of the system indicating that the media liquid has been depleted. The media liquid 41 then is drained from the lower compartment 20A (through a drain opening not shown). Since the depleted HCl is only about 3% concentration, it readily can be neutralized with soda ash and returned to the pool. No hazardous byproducts are formed, since the depleted HCl media is water. The compartment 20A then is refilled with a fresh supply of concentrated hydrochloric acid.

The placement of the electrodes 57 and 58 at the bottom and near the top of the lower compartment 20A, inherently provides additional operating and safety features for the chlorine generator 20. With this configuration, current through the electrodes 57 and 58 causes a bubbling action (electrolysis or breaking down of the component parts of the HCl under pressure) from the electrodes. This causes the media liquid 41 to stay mixed through agitation from the bubbling action, which extends from the lower electrode 57 upward through the contents of the media liquid in the compartment 20A. This mixing action is advantageous because hydrochloric acid has a tendency to have heavier molecules settle or separate over time, into the bottom of the container. This is especially advantageous as a result of the periodic addition of the spash-over or make-up water 46 through the screen 52 into the lower compartment to replenish the level of the media liquid 41 as the HCl is broken down to produce chlorine gas.

Another advantage of the location of the electrodes 57 and 58, in the "high-low" position shown, is that if the media liquid 41 is depleted to a level below the upper electrode 58, current flow across the electrodes immediately stops. No additional chlorine gas is produced; so that no large volume of chlorine gas can accumulate in the upper portion of the lower compartment 20A between the floor 40 and the upper level of the media liquid 41. If the electrodes were placed together near the top of the tank, or if they were vertically oriented from the top to the bottom of the tank, current would continue to flow across the electrodes even when the media liquid 41 dropped below a safe level. A spark across the electrodes then could cause an explosion inside the container under these conditions.

If both of the electrodes 57 and 58 were placed in the bottom of the compartment 20A, the electrodes could continue to produce hazardous gases, even if the level of the media liquid 41 fell below a safe level, creating an oversized gas chamber in the top of the compartment 15A. Again, this produces a potentially dangerous condition.

With the electrode arrangement shown in FIG. 2, the chance for explosion is substantially minimized. If the media liquid 41 depletes in the tank, the circuit is broken and gas production is stopped immediately. As a result, the gas chamber above the upper surface of the media liquid 41 can only attain a known finite volume before the generator circuit is opened and gas production stops. In addition, no sparks can be generated, since the electrode 57 is always fully submerged in the media liquid 41. This is a significant advantage to the unconventional electrode placement, which is shown in FIG. 2.

Figure 4:
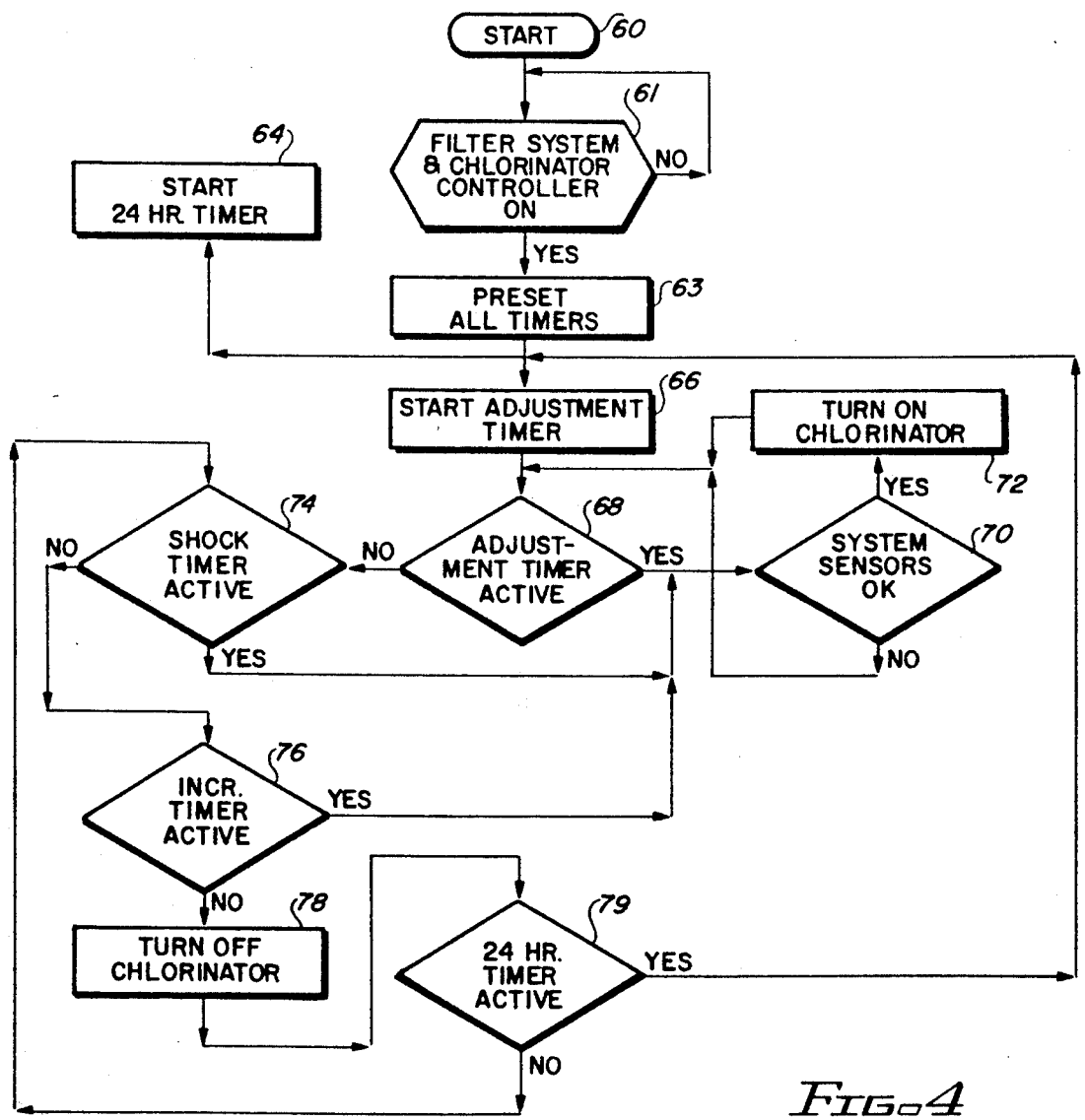
FIG. 4 is an operating flow chart of the system shown in FIG. 1.

Reference now should be made to FIG. 4, which illustrates a flow chart operation of various timers and sensors, used in the controller 30 to ensure accurate and safe operation of the chlorine generator 20. At such time as the operation of the chlorine generator is to start (60), an initial check is to determine if the filter system and chlorinator controller is on (61). This is done by determining whether the pump 12 is operated or not. If the system is on, the next step is to preset all of the timers (63). This includes setting of a 24-hour timer (64), which subsequently is used to control the cycle of operation of the system in a conventional manner. Typically, the 24-hour timer (64) also determines when the start (60) is initiated.

The present all timers (63) also operates a start adjustment timer (66); and a determination is made to establish whether the adjustment timer is active (68). If the adjustment timer is active, a check is made of the system sensors (70). If the system sensors are functioning "ok", the chlorinator is turned on (72). This loop between the adjustment timer (68), the system sensors (70), and the chlorinator "on" (72) then continues throughout the operation of the system.

If the system sensors indicate an alarm condition (for example, if the flow sensor 22 provides an output signal or if the pressure sensor 41 provides an output signal), the chlorinator is not turned on, but the loop between the adjustment timer active (68) and the system sensors (70) continues until a change occurs. In such a case the chlorination is not turned on.

If the adjustment timer is not active (68), a determination is made whether an additional shock timer (74) is active if the shock timer is active, the loop through the system sensors (70) and the chlorinator (72) is repeated, as indicated above.

If the shock timer is not active, a determination is made as to whether an increment timer (76) is active. If this timer is active, again, the system sensor loop (70) and the chlorinator turn-on (72) is operated as described above. If, however, neither the shock timer (74) is active, nor the increment timer (76) is active, the chlorinator is turned off at (78). This action causes a check to determine whether the 24-hour timer is active at (79). If it is, a signal is sent back to start the adjustment timer (66) to re-establish the process described above. If the 24-hour timer is not active, the shock timer active determination again is made at (74), with the various results indicated in FIG. 4.

The various timers, which are described in conjunction with FIG. 4, are not shown in detail in the controller 30. The sequence of operation, however, is one which ensures proper and safe operation of the chlorinator 20, essentially causing the chlorinator 20 to be operated in a "fail safe" manner.

The foregoing description of the preferred embodiment of the invention is to be considered as illustrative, and not as limiting. For example, the particular physical construction of the electrodes 57 and 58 has not been indicated, since suitable electrodes for immersion in hydrochloric acid may be made of various materials and may be employed in a variety of different physical configurations. Although specific materials have been mentioned for the different compartments of the chlorinator 20, other materials which are capable of being used in the corrosive atmosphere of the hydrochloric acid and chlorine also may be employed, if desired. The particular physical arrangement of the chlorinator in a square or rectangular cross section, also is not necessary, and a generally cylindrical configuration may be employed. Other changes and modifications will occur to those skilled in the art, without departing from the true scope of the invention as defined in the appended claims.

We claim:

1. A chlorine generator for electrically generating chlorine from a media liquid including in combination:
    an enclosed container having a first compartment, for holding said media liquid, and a second compartment;
    a divider separating said first compartment from said second compartment, said divider having an opening therethrough at the top of said first compartment into a portion of said second compartment;
    first and second spaced-apart electrodes in said first compartment adapted for connection across a source of electric current; and
    means for supplying water to said second compartment, and for removing water from said second compartment at a water level in said second water compartment normally held below said opening as a result of gas pressure in said second compartment above the surface of said water.

2. The combination according to claim 1 wherein said means for supplying said water to said second compartment, and for removing water from said second compartment, comprise inlet and outlet water pipes spaced apart from one another.

3. The combination according to claim 2 wherein said first and second spaced-apart electrodes are located within said first compartment, with said first electrode near the bottom thereof, and with said second electrode located near the top thereof adapted to be below the upper surface of media liquid in said first compartment.

4. The combination according to claim 3 wherein said first and second compartments are lower and upper compartments, respectively, and side walls surround the opening in said divider and extend upwardly into said upper compartment, said side walls having a vertical height less than the distance between said divider and the top of said upper compartment, and selected such that water is permitted to splash over the top of said side walls to pass through the opening in said divider into said lower compartment to replenish media liquid therein in response to reduction in the pressure of gas above the water level in said upper compartment.

5. The combination according to claim 4 wherein said opening through said divider is located substantially in the center of said divider, and said inlet and outlet water pipes are arranged to cause water to flow around said side walls surrounding said opening.

6. The combination according to claim 5 further including a source of electric current, and means for coupling said source of electric current with said first and second spaced-apart electrodes; and pressure sensing means coupled with said upper compartment for sensing the pressure of gas within said upper compartment above the surface of the water therein for terminating the application of electric current to said first and second electrodes when said pressure exceeds a predetermined value.

7. The combination according to claim 6 further including flow sensing means coupled with one of said water inlet and water outlet pipes for terminating the application of electric current to said first and second electrodes when water flow sensed by said flow sensing means drops below a predetermined value.

8. The combination according to claim 5 further including controller means for selectively supplying electric current to said first and second spaced-apart electrodes in response to a predetermined flow rate of water through said upper compartment and gas pressure in said upper compartment, of less than a predetermined value.

9. The combination according to claim 8 wherein said source of electric current is a source of direct current.

10. The combination according to claim 1 wherein the opening in said divider is located such that water is permitted to pass through the opening in said divider into said first compartment to replenish media liquid therein in response to reduction in the pressure of gas above the water level in said second compartment.

11. The combination according to claim 10 further including controller means for selectively supplying electric current to said first and second spaced-apart electrodes in response to a predetermined flow rate of water through said second compartment.

12. The combination according to claim 1 further including a source of electric current, and means for coupling said source of electric current with said first and second spaced-apart electrodes; and pressure sensing means coupled with said second compartment for sensing the pressure of gas within said second compartment above the surface of the water therein for terminating the application of electric current to said first and second electrodes when said pressure exceeds a predetermined value.

13. The combination according to claim 12 further including flow sensing means coupled with one of said water inlet and water outlet pipes for terminating the application of electric current to said first and second electrodes when water flow sensed by said flow sensing means drops below a predetermined value.

14. The combination according to claim 1 wherein said means for supplying said water to said second compartment, and for removing water from said second compartment, comprise inlet and outlet water pipes spaced apart from one another.

15. The combination according to claim 14 wherein said first and second compartments are lower and upper compartments, respectively, and side walls surround the opening in said divider and extend upwardly into said upper compartment, said side walls having a vertical height less than the distance between said divider and the top of said upper compartment, and selected such that water is permitted to splash over the top of said side walls to pass through the opening in said divider into said lower compartment to replenish media liquid therein in response to reduction in the pressure of gas above the water level in said upper compartment.

16. The combination according to claim 1 further including controller means for selectively supplying electric current to said first and second spaced-apart electrodes in response to a predetermined flow rate of water through said second compartment.

* * * * *